United States Patent [19]
Birckhead

[11] Patent Number: 4,737,060
[45] Date of Patent: Apr. 12, 1988

[54] STAGGERED TEETH PLATE

[76] Inventor: Robert W. Birckhead, P.O. Box 2225, Pompano Beach, Fla. 33061

[21] Appl. No.: 771,136

[22] Filed: Aug. 28, 1985

Related U.S. Application Data

[62] Division of Ser. No. 206,866, Nov. 14, 1980, Pat. No. 4,549,838.

[51] Int. Cl.$^4$ ............................. F16B 5/00; F16B 15/00
[52] U.S. Cl. ................................... 411/468; 403/405.1
[58] Field of Search ...................... 403/405.1; 411/468, 411/467, 458, 459, 461, 462, 463, 464, 466

[56] References Cited

U.S. PATENT DOCUMENTS

| | | | |
|---|---|---|---|
| 1,953,303 | 4/1934 | Kohlmann | 411/466 X |
| 3,494,645 | 2/1970 | Jureit | 403/405 |
| 3,603,197 | 9/1971 | Wood | 403/238 X |

FOREIGN PATENT DOCUMENTS

| | | | |
|---|---|---|---|
| 391630 | 11/1908 | France | 411/466 |
| 414303 | 6/1910 | France | 411/466 |
| 1037250 | 4/1953 | France | 411/466 |
| 7916092 | 11/1979 | United Kingdom | 411/466 |

Primary Examiner—Andrew V. Kundrat
Attorney, Agent, or Firm—Malin, Haley & McHale

[57] ABSTRACT

A method for quickly manufacturing a connector plate of varying design strength in a minimum size plate for joining wooden members which approximates the ideal connector plate for that particular design, thereby making it unnecessary to use plates of greater strength than required. The plate is produced with a controlled number of teeth extending transversely outwardly from one major side of the plate in varying patterns. The new and improved method includes feeding sheet metal stock of predetermined width through a die having a plurality of punches that are controlled for relative movement with respect to the stock, striking the sheet metal plate with the die at predetermined intervals to form the particular desired pattern of teeth extending from the plate and leaving a plurality of longitudinally extending slots formed in the plate, and cutting the plate when the desired total length of the plate is reached. Therefore a variety of connector plates may be constructed of minimum area, while realizing maximum tensile strength. A method of making an ideal plate can be accomplished by feeding stock into a punch press having a die with a plurality of punches configured in an ideal pattern, and punching the stock making an ideal connector plate.

1 Claim, 6 Drawing Sheets

Feed

STAGGERED TEETH PLATE

This application is a division of application Ser. No. 206,866 filed Nov. 14, 1980 now U.S. Pat. No. 4,549,838.

BACKGROUND OF THE INVENTION

This invention relates to metal connectors, methods of manufacturing metal connectors, and machines for manufacturing metal connectors, and more particularly to a method of manufacturing a metal connector plate by use of die or dies of a different pattern and variable actuating device of the sheet metal feed mechanism for use in prefabricated wooden structures, such as roof trusses, floor joists, and the like.

In the past, there have been various types of metal connector plates used to hold wooden members in adjoining relation. By way of example is U.S. Pat. No. 3,377,905, in which a connector plate is illustrated. The connector plate has a multiplicity of teeth extending transversely outwardly from the plate. Each tooth has a base portion and a tip portion of substantially lesser width than the base portion. The opposed edges of each portion are generally parallel with one edge of the tip portion being a continuation of one edge of the base portion. These teeth may be oriented in rows parallel to the transverse mid-line of the plate with the number of teeth per row providing the plate itself with a particular tensile strength. As shown the first row of teeth on each side of the mid-line or mid-portion has lesser teeth than the more remote row or rows. The teeth may also preferably be located in columns parallel to, and on each side of, the longitudinal medial portion of the plate.

Another example is shown in U.S. Pat. No. 3,494,645 in which a high sectioned splice plate and joint therewith is illustrated. The plate has a plurality of nail-like teeth struck therefrom for embedment in a pair of butting wooden members to form a structural joint. The plate has an enlarged band of metal along the opposite lateral edges in which no teeth are struck and has a limited number of teeth across a given cross-section whereby the moment of inertia, cross-section and overall effect of that section of the plate are increased. The plate further approaching a minimum length to width ratio so as to provide a sufficient number of teeth to carry tensile loadings.

The present invention provides a die and variable actuating device to manufacture a new and improved metal connector plate to a desired pattern. The plate is manufactured such that the cumulative tooth holding power of the plate teeth in each column generally increases when advancing to each successive column away from the center line as more teeth are added in the cross-section, in opposite directions from the transverse center line and the plate tearing value remains approximately the same as the plate tearing value in the first column each side of the transverse center line.

SUMMARY OF THE INVENTION

According to the present invention, a method of manufacturing a metal connector plate, a die and variable actuating device for manufacturing a metal connector plate and the metal connector plate are provided. The method for manufacturing the metal connector plate for joining wooden members includes feeding sheet metal stock of predetermined width into a die area having a plurality of punches that are in a fixed position with respect to the stock, striking the sheet metal stock with the punches at predetermined controlled intervals to form a pattern of nail-like teeth extending at right angles from one side of the plate, leaving a pattern, which approximates an ideal pattern, of a plurality of longitudinally extending slots formed in the plate, and cutting the plate when the desired length of the plate is reached. Therefore, by varying the pattern of opposing nail-like teeth, different plates can be quickly manufactured according to the application of each different plate having different tensile strength, shear strength and total holding power of the teeth without changing the die in the machine. The prime concern in designing the pattern is maintaining a maximum cross-section of plate material per unit width of plate near the joinder line of the wooden members to be joined by the particular plate. On either side of the joinder line in both directions the number of nail-like teeth can be increased proportionally to the decrease in force on the plate due to the forces being taken up and transferred to the wooden members by the row of teeth nearest the joinder line. By using the aforesaid method and equipment to provide the desired patterns, the connector plate therefore has minimal length and width dimensions while realizing or approaching maximum cross-sectional surface strength for a particular use. A plurality of plates for varying use may be manufactured without changing the die, only control system adjustments being required.

It is therefore an object of the present invention to provide a method of manufacturing a plurality of metal connector plates of varying designs, lengths or widths quickly and economically.

It is another object of the present invention to provide a machine which can be used to manufacture a plurality of metal connector plates of different designs from a minimum amount of metal stock without losing sufficient connector plate strength.

It is still another object of the present invention to provide a new and improved metal connector plate having maximum strength utilizing minimal width and length dimensions of the plate for each particular design used.

In accordance with these and other objects which will be apparent hereinafter, the instant invention will now be described with particular reference to the accompanying drawings.

BRIEF DESCRIPTION OF THE DRAWINGS

FIGS. 1D and 1E illustrate the design steps in constructing an ideal embodiment of the invention.

FIGS. 1F through 1P illustrate approximations of the ideal embodiment.

FIGS. 9A through 9I are an illustration in sequential form of the process of manufacturing a single connector plate.

DESCRIPTION OF THE PREFERRED EMBODIMENT

Figure 1A:
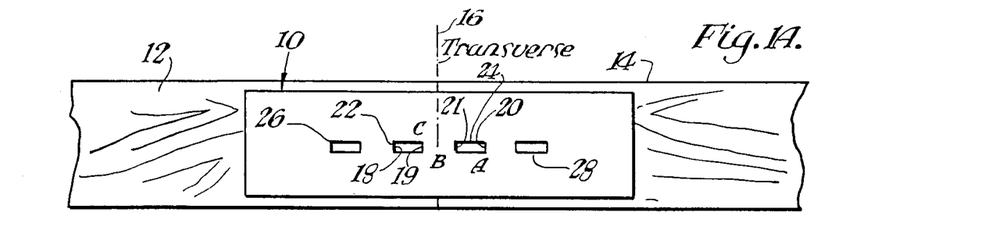
FIG. 1A is a side view of a connector plate with a single opening on each side of the joinder line with teeth in lumber pieces.
Figure 1B:
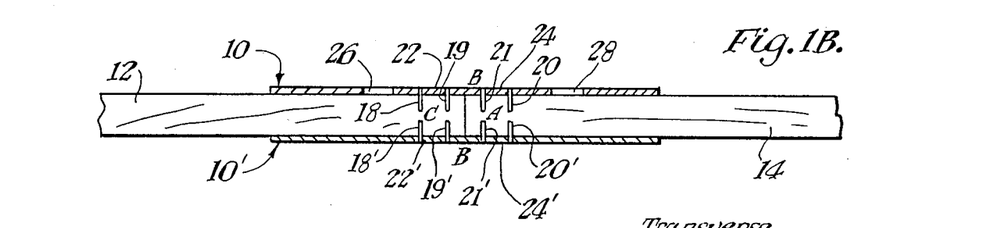
FIG. 1B is a top view of FIG. 1A.
Figure 1C:
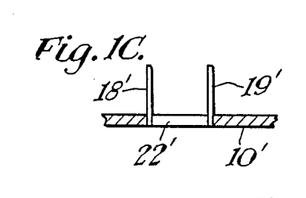
FIG. 1C is a partial, blow-up of FIG. 1B.

Referring now to the drawings and more particularly to FIGS. 1A, 1B and 1C a connector plate is shown generally at 10, connecting the abutting lumber pieces 12 and 14.

An ideal tension plate is a plate so designed to achieve the maximum tension from a given width of material. When joining two pieces of wood, which abut at the joinder line, the minimum number of holes adjacent to each side of the joinder line will provide the maximum cross-section of place material resulting in the highest plate tensile strength. The minimum number of teeth forming holes is one hole per unit of plate width. The teeth projecting from the end(s) or edges of each hole when forced into the lumber, have a tooth holding or lumber gripping ability and value.

Lumber pieces 12 and 14 have the tension plates 10 and 10' equally spaced about a joinder line and the teeth 18, 19, 20 and 21 of the plate 10 and 18', 19', 20' and 21' of the plate 10' embedded into the lumber pieces 12 and 14. The tension plate 10 has only one tooth forming hole 22 and 24 on each side of the plate center line as does the plate 10'. Forces are applied to lumber pieces 12 and 14 on to try to pull the lumber pieces 12 and 14 apart. The forces are resisted by the tension plate as shown in FIG. 1B. The force in lumber piece 14 is resisted by the teeth 20, 21, 20' and 21' at A which transfers the force outwardly to the base material of the tension plate at each edge of the tooth forming holes 24 and 24'. This force is then transferred through the base material B to the edge of the tooth forming holes 22 and 22' at C. The teeth 22 and 22' at C now transfer the force inwardly to the wood of lumber piece 12. And conversely the same type of load transfer originates at the C teeth and ends in the A teeth.

The original highest material tension value can be maintained, even though more tooth forming holes are perforated in sequencial rows that are further away from the vertical end of the plate.

Systematically located tooth forming holes will provide a total tooth holding value capable of transferring tension out of the plate and into the lumber equal to or greater than the tension value reduction in the plate cross-section due to additional tooth forming holes.

Figure 1D:
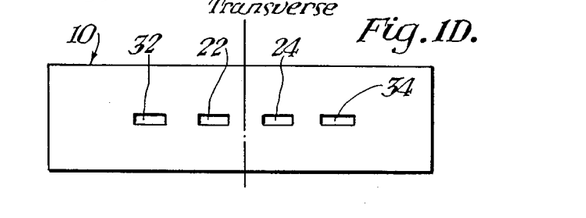

Each additional tooth into the lumber helps transfer more tension between lumber pieces 12 and 14 while the addition of each tooth forming hole reduces the plate cross-section at that particular column of holes. (See FIG. 1D) If a tooth forming hole is added to the same row in the next column, such as hole 32 and hole 34, the base material cross-section is not decreased and remains the same as at the 22 and 24 holes.

Now the tooth holding values on each side of the plates vertical center line have been increased, but the plates smallest cross-section remains the same, so the plate tension value remains the same.

Figures 1E, 1F:
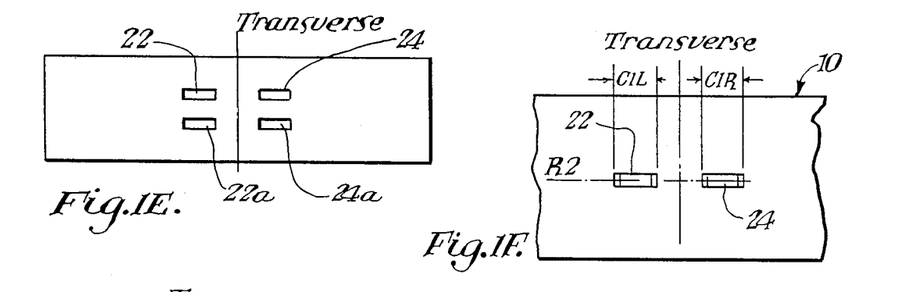

If the tooth forming holes 24a and 22a were added in the vertical columns with holes 24 and 22 as shown in FIG. 1E, both the tooth holding values and the base plate cross-sections change. The tooth holding values on each side of the plates vertical center line have again been increased but the plates smallest cross-section has been decreased, so the plate tension value decreases proportionally. It can readily be seen that by choosing the correct pattern of tooth forming holes so that the tooth holding force of the teeth into the wood in the column of holes closest to the plate center line, is equal to or greater than the cross-sectional plate tension value decrease in the next column of holes away from the plate center line, the plate will retain its highest tension value. This tension value is the same as when only one tooth forming hole has perforated the base material of the plate.

As an example, let us assume the following: A plate with a given width has a tension value of 30 units of strength. A tooth forming hole decreases the plate tension value by 4 units. Each tooth has a gripping power in the wood of 1.0 units and there are 2 teeth per hole.

The teeth are formed at the right and left ends of the holes. The tooth closest to the plate vertical center line, in each hole, is assumed to transfer half of its tooth holding to the basic plate material prior to the tension in the basic plate going around each hole. This "prior to hole transfer" equals 0.5 units.

The plate width limits the number of rows of holes to three lines. Gross tooth holding assumed.

Let us now choose and calculate the maximum plate tearing value and the pattern for the tooth forming holes.

Referring now to FIG. 1F perforate tooth forming holes 22 and 24 in the first column C1L and C1R on each side of the vertical center line of the plate in the same row R2. Each hole 22 and 24 is equally spaced on either side of the plates vertical center line and on the plates horizontal center line.

The plates highest tension value equals the original basic plate strength less the decrease in strength for one hole, or 30 units—4 units=26 units of tension at maximum strength.

Figure 1G:
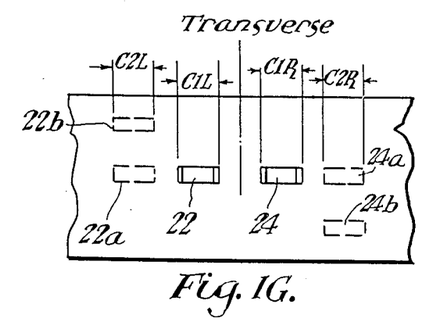

(See FIG. 1G)—Now if two holes are desired in the second columns C2R and C2L on each side of the vertical center line, with one of the holes 22a and 24a on each second column aligned along the horizontal center line of the plate and the other hole 22b in one column C2L above the horizontal center line and the other hole 24b in the second column C2R below the horizontal center line the plate reduction would be. Additional basic plate reduction=2 holes 1 hole in C1L or C1R=1 hole×4= 4 units of reduction beyond the 26 units if total tooth holding prior to hole is not greater than 4 units. However, the total tooth holding strength including the second columns is equal to (2×1)+(2×0.5)=3 units. The additional basic plate reduction of 4 is greater than the total tooth holding of 3 so only one tooth forming hole may be added in each second column. If two tooth forming holes were permitted in each second column the basic plate tension value would be reduced (4−3=1) one more unit from 26 units to 25 units.

Figure 1H:
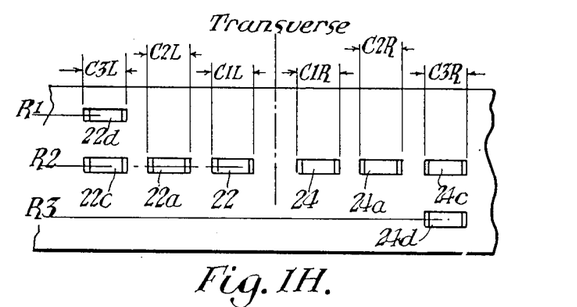

Referring to FIG. 1H, the tooth holding strength and basic plate tension, with two holes 22c and 22d, and 24c and 24d in the respective columns C3L and C3R and only one hole in each first and second column along the horizontal center line of the plate, can be calculated. Additional plate tension reduction would be as follows:

C1L or C1R 2 holes−1 hole in C1L or C1R=1 hole×4 units=4 units of additional reduction. The tooth holding strength would be equal to (2×2)+(2×0.5)=5 units of tooth holding strength which is greater than the additional basic plate tension reduction, so that two tooth forming holes in columns C3L and C3R are permitted in each third column.

Figure 1I:
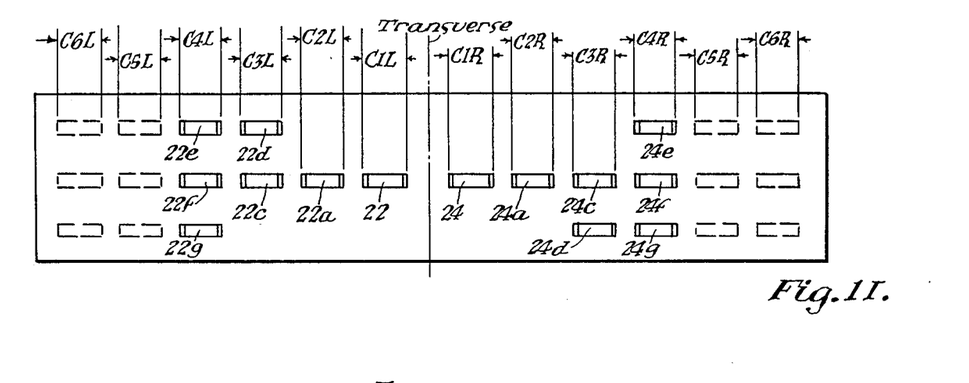

Finally referring to FIG. 1I check the tooth holding strength and basic plate tension reduction in columns C4L and C4R with three holes in each fourth column, keeping in mind that three holes in any column is the maximum allowed because of the width restriction of the plate and the configuration of the previous columns are maintained. Additional plate reduction would be as follows: 3 holes−1 hole in the first column=2 holes×4 units=8 units of additional reduction. The tooth holding strength would be equal to (4×2)+(3×0.5)=9.5 units of tooth holding.

The total tooth holding strength of the four columns of teeth is greater than the basic plate tension reduction so three tooth forming holes in columns C4L and C4R are permitted.

By continuing this same type of procedure a pattern of holes for any plate width may be determined.

At this time we now have the maximum number of tooth forming holes permitted per column in this example plate. The maximum for this selected plate width was three rows of holes in each column. Our tooth holding capacity is 7×2=14 units, but the plate is capable of 26 units of tension so we still need 26−14=12 units of tooth holding capacity. We must now build the tooth holding power to be equal to or greater than the plate tearing value. By continuing the calculations it would be seen that by adding three tooth forming holes in each fifth and sixth columns in each side of the vertical center line of the plate (C5R, C6R, C5L and C6L) a total of 26 teeth on each side of the vertical plate center line would provide 26×1=26 units of tooth holding power. The tooth holding strength is now equal to or greater than the plate tearing value.

Therefore, in progressing longitudinally in either direction from the vertical center line of the basic plate, the tooth holding power to transfer the forces into or out of the lumber has built up in a manner to equal or exceed the decrease in plate tearing value at the next succeeding row of tooth forming holes. These effects are cumulative.

If it is found that the engineering and economy factors are such that the first row of tooth forming holes on either side of the vertical centerline of the plate satisfy these factors (engineering and economy) to a higher degree, then two or more tooth forming holes may be in the first row either side of the vertical centerlines as a starting option.

In order to produce the ideal plate, a die can be made that is to punch the complete pattern of tooth holes as mentioned above for each stroke of the punch press.

Standard industry feed mechanisms will be used to feed the steel stock a distance representing the width or an increment of the width of the plate. The length of the final plate is the actual "width" of the coil or strip of steel. The width of the plate can be regulated by the number of "feeds" before a cutoff blade is actuated to cut the plate. Any width plate may be made but it must always be a multiple of a "feed" increment.

Lumber widths are 3.5", 5.5", 7.25", 9.25" and 11.25" for 2×4, 2×6, 2×8, 2×10 and 2×12 respectively.

In the preferred embodiment, the width of the plate would be controlled by having two feeds for a plate used on the 2×4, three feeds on a 2×6, four feeds on a 2×8, five feeds on a 2×10 and six feeds on a 2×12. Each feed to be $1\frac{3}{8}"\pm\frac{1}{8}"$. This would give the following exclusive plate width options in relation to the lumber width for this type of plate.

| LUMBER WIDTH | MIN. PLATE WIDTH $1\frac{3}{8} - \frac{1}{8} = 1\frac{1}{4}"$ | MAX. PLATE WIDTH $1\frac{3}{8} + \frac{1}{8} = 1\frac{3}{4}"$ |
| --- | --- | --- |
| 2 × 4 = 3.5" | 3.0" to | 3.50" |
| 2 × 6 = 5.5" | 4.5" to | 5.25" |
| 2 × 8 = 7.25" | 6.0" to | 7.00" |
| 2 × 10 = 9.25" | 7.5" to | 8.75" |
| 2 × 12 = 11.25" | 9.0" to | 10.50" |

The ideal tension plate, for a given cross section or width, has only one tooth hole. Now assume a plate of similar width with 2 tooth forming holes in the first column (See FIG. 1E) on either side of the plates vertical center line. The tearing value is 30−(2×4)=22 units. Now check for three tooth forming holes in columns C2L and C2C on either side of the vertical center line. Additional tearing reduction=(3−2)=(1×4 units per hole)=(4 units). Tooth holding=(2 holes×2 teeth per hole)+(3 holes×0.5 value per leading tooth prior to hole)=5.5 units. Therefore three tooth forming holes are permitted in columns C2L and C2R and all columns thereafter. (See FIG. 1J). Twenty-two teeth of 1 unit strength each are required on each side of the vertical center line to equal or exceed the plate tearing value.

Figure 1J:
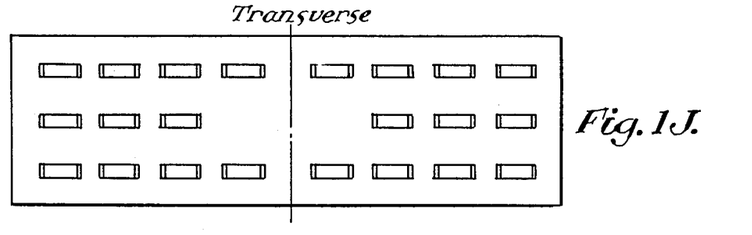

The three columns of three tooth forming holes and one row of two tooth forming holes on each side of the plate vertical center line provide the twenty-two teeth required to make the tooth holding equal or greater than the twenty-two units of tearing value. Compared to the plate in FIG. 1I, this plate is only 8 holes long versus 12 holes long and uses only 8/12 or $\frac{2}{3}$ of the material. In many cases a plate as strong as the "ideal tension plate" of FIG. 1I is not required for a lower amount of tension so that such a plate as depicted in FIG. 1J is adequate and ideal for that condition and more economical.

Up to now only plates that are manufactured with material fed in the "plate-width" direction where the width of the material being fed into the die is the final length of the plate have been discussed; the plate width being the variable. Plates made with material fed into the die in the "plate-length" direction must also be investigated.

Figure 1K:
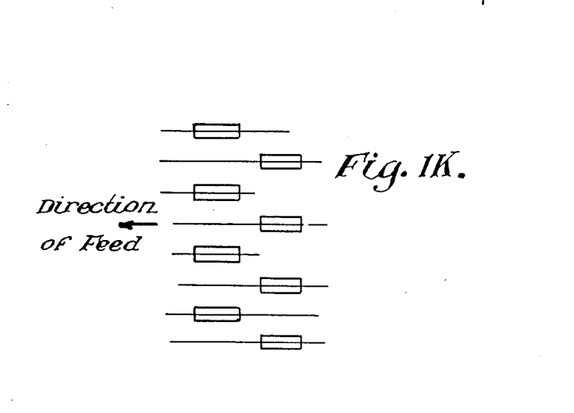
Figure 1L:
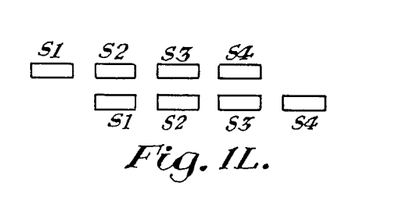

If a die has the tooth forming holes (TFH) in a zig-zag pattern of two staggered holes, a portion of the die will look like that shown in FIG. 1K. In the vertical direction, the two TFH pattern is repeated again, again, etc. Now take a typical two staggered hole segment and investigate what type of plate can be manufactured from it. If the TFH are one inch apart horizontally (in the direction of feed thru the die), and the amount of feed is one inch after each set of two staggered holes is punched, a TFH pattern shown in FIG. 1L will be made as designated in the holes S1, S2, S3 and S4.

Figure 1M:
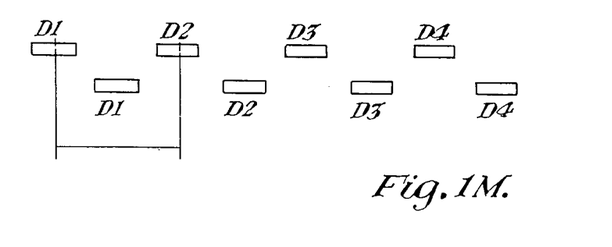

Now if the feed is changed to two inches after each set of two staggered holes is punched, a TFH pattern shown in FIG. 1M will be made as designated by the holes D1, D2, D3 and D4.

Figure 1N:
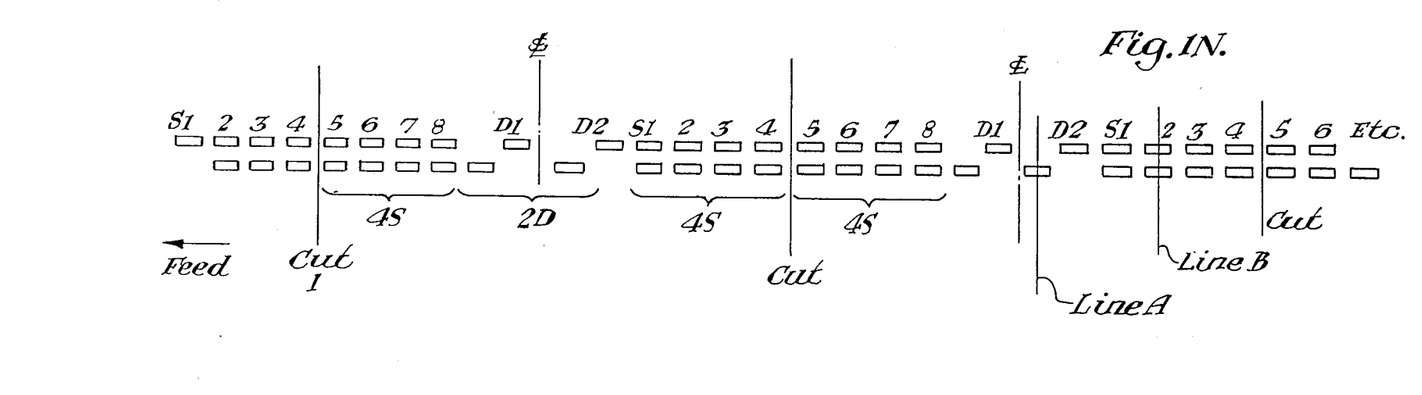

By combining these two patterns and controlling the quantity of single and double feeds (progressions) we can produce an almost endless quantity of different patterned truss plates. FIG. 1N shows one such pattern using (8) one inch feeds (or progressions) and (2) two inch feeds in repetitive sequence. (See FIGS. 9A through 9I for more detail).

As the plate is progressively fed to the left it comes to the die "cutoff" station and is cut to length at the lines designated by "Cut." Start at the word "cut 1". From left to right, we now have a plate with 4 columns of double holes, 4 columns of 1 hole and 4 columns of double holes. Assume the width of each hole to be the same width as the material left between the holes in the vertical direction. Assume each to be $\frac{1}{8}''$ (0.125"). The plate is then $4 \times 0.125'' = 0.5''$ wide. A cross section taken at Line A cuts through only 1 hole so there is $0.5'' - (1 \times 0.125'') = 0.375''$ of metal or $0.375'' \div 5'' = 75\%$ metal. A cross-section taken at Line B cuts through 2 holes so there is $0.5'' - (2 \times 0.125'') = 0.25''$ of metal or $0.25'' \div 0.5'' = 50\%$ metal. This shows that the plate in the vicinity of the two single hole columns on either side of the plate vertical center line has a greater metal cross section thereby resulting in a higher tension value for the plate. Now the exact pattern of single and double progressions (feeds) may be determined again, as previously described, to equate the tooth holding equal to or greater than the plate tearing decrease due to additional TFH in the next adjacent rows, either side of the plates vertical center line.

Figure 1P:
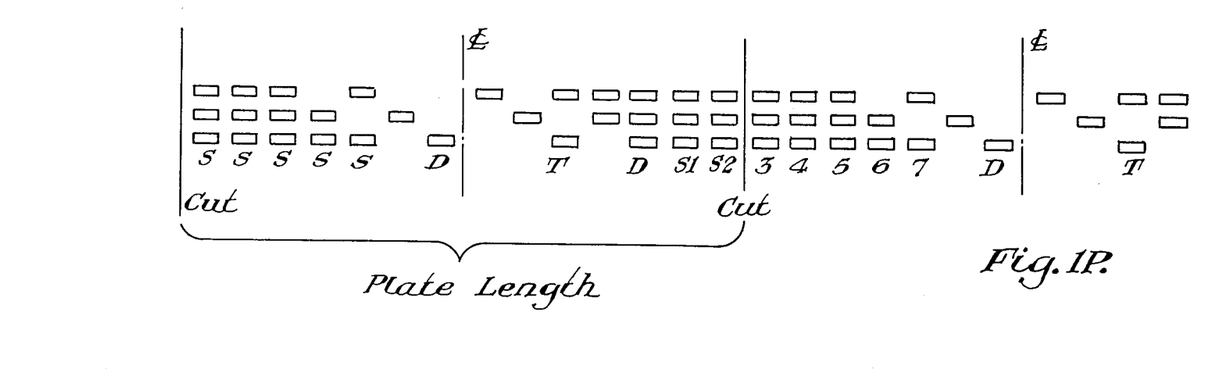

Another pattern with three staggered TFH and variations in progressions (feed) of the blank metal stock is illustrated in FIG. 1P. This progression (feed) pattern consists of seven single feeds, one double feed, one triple feed and one double feed. The pattern then again repeats itself. The resulting tension plate has a very good cross section at the center of the plate. Only one hole is in the two columns adjacent to the plates vertical center line. Again assuming equal hole width and plate material between holes equal to the TFH width, the plate cross section near the plate vertical center line can be calculated. The assumed width for 3 holes and 3 pieces of metal is now $6 \times \frac{1}{8}'' = 0.75''$. Therefore $0.75'' - (1 \times 0.125'') = 0.625''$. $0.625'' \div 0.75'' = 0.833$ or $83.3\%$ steel. Other variations can be made with this three TFH pattern with different single, double and triple feed sequences. An almost unlimited number of TFH patterns and feed sequences can be devised.

Figures 9A, 9B, 9C, 9D, 9E, 9F, 9G, 9H:
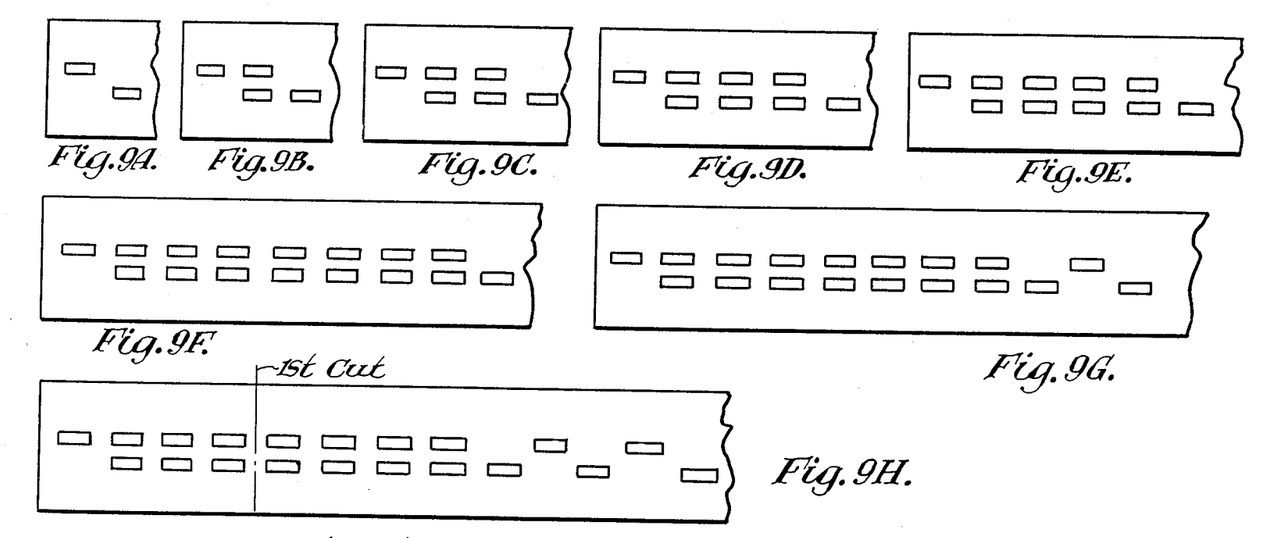
Figure 9I:
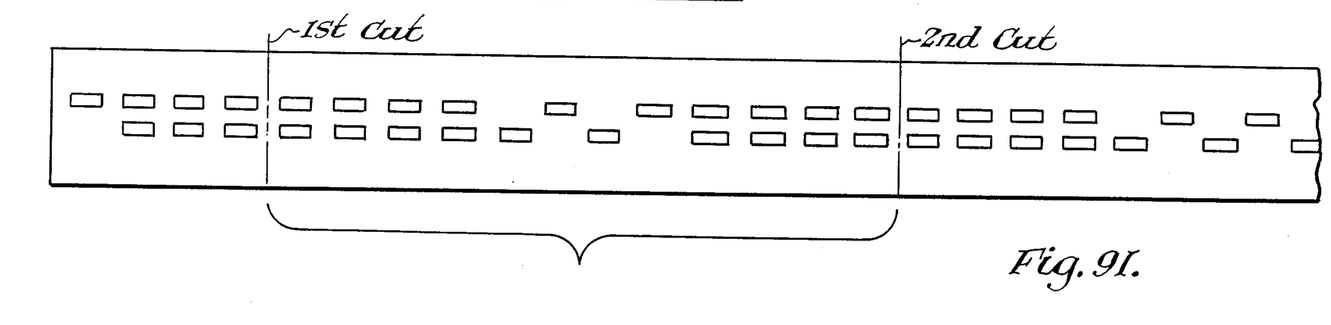

Referring to FIGS. 9A through 9I, the Zig-Zag two staggered hole pattern of just two rows, as the material is fed through the die from right to left, is shown. One stroke of the punch press will pierce two tooth forming holes, one on row one, and one on row two as shown in FIG. 9A.

The stock is then fed one progression and the second stroke takes place. This is repeated through 8 strokes as shown in FIGS. 9B through 9F. After the eigth stroke the stock is fed a double progression and then stroke 9 takes place (See FIG. 9G). Another double progression feed and stroke 10 takes place (See FIG. 9H). There has been 8 single progression feeds and 2 double progression feeds. This pattern is repeated continuously to manufacture this plate pattern. The pattern on one side of the transverse center line of the plate is the inverted mirror image of the pattern on the opposite side of the transverse center line of the plate.

The feed mechanism (as previously discussed in FIGS. 2 and 3) is a standard "off the shelf" air feed item, that has the following modification. The feed mechanism is set for the longest desired feed which is 2 progressions. The feed can be adjusted within limits up to about twelve inches depending on the feeder. We will say each progression is one inch so 2 progressions will be two inches of feed. The feeder is set for the two inch feed (2 progressions) and will always feed that distance as the travel of the feed bar is now two inches. Now if we insert a one inch thick block between the feed bar and the feed bar stop in the block position, the feed bar cannot return to its normal travel of two inches, just 1 inch. Now the forward movement of the feed bar is stopped at the same previous location so the feed is reduced to one inch.

By inserting the 1.000" block up into the feed bar travel area, the feed is reduced to 1.000".

As the punched plate moves to the end of the die at the cutoff blade, the blade is actuated to cut once every 10 strokes of the punch press because the plate is composed of 8 short and 2 long feeds. (See FIG. 9I)

The cutoff blade tripping mechanism is standard for the industry and cuts the plate in the middle of the eight single progression area each time. This leaves this particular plate with four single progressions, two double progressions and again four single progressions at the other end (See FIG. 1N).

This is but one of a series of different TFH patterns that can be made with one difference in the travel distance of the feed bar.

Now assume the back feed stop were set to three inches instead of two inches, and two blocks were used (to be inserted) of 1.000 inches and 2.000 inches, or one block of 1.000 inch and 2.000 inch in a step shaped block or any other shaped block or blocks that will permit three different feeds. A more complex mechanism is required using the same principals that will permit a plate similar to the pattern shown in FIG. 1P. Variations of this are also possible.

Figure 2:
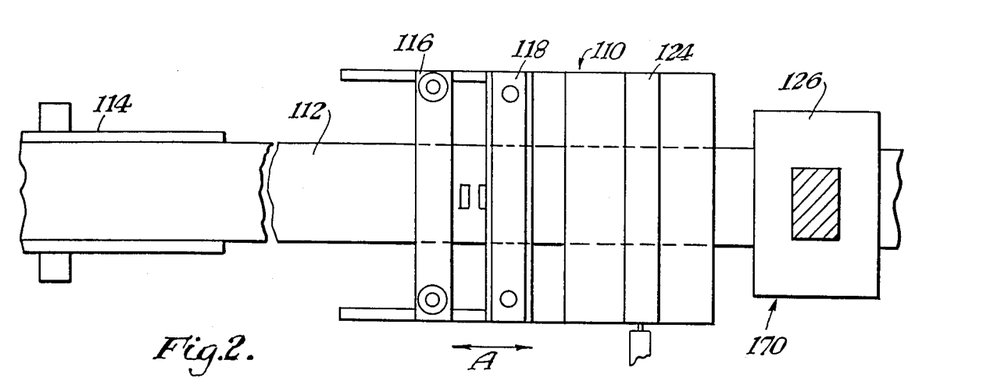
FIG. 2 is a top plan view of the feeding mechanism of the manufacturing system used for manufacturing the metal connector plates.
Figures 3, 4B:
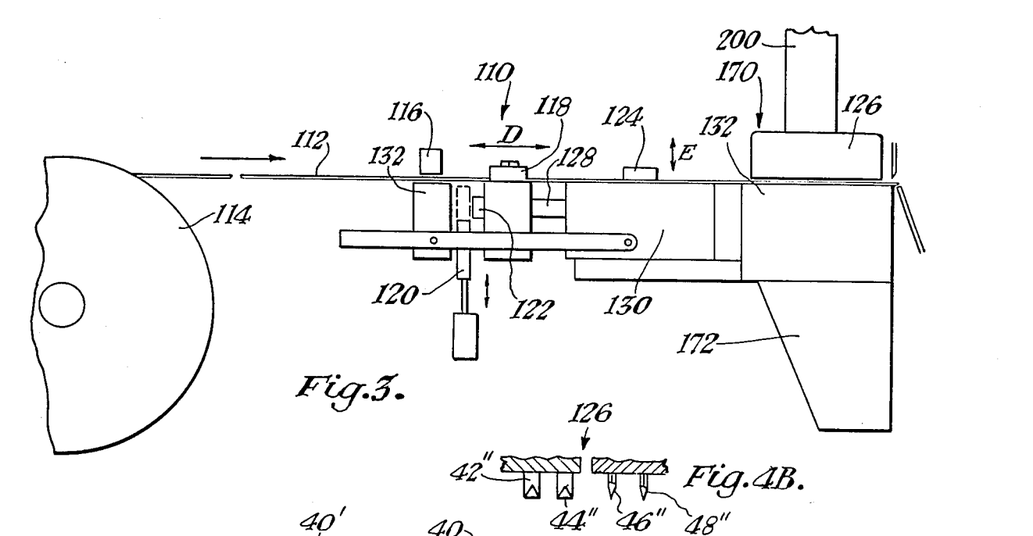
FIG. 3 is a side view of the feeding mechanism and top die for stamping out metal plates shown in FIG. 2.
FIG. 4B is a partial side view of the top die.

Referring particularly to FIGS. 2 and 3, the stock feeding mechanism is shown generally by numeral 110. The flat metal sheet or metal stock 112 is fed from a roller 114 in between the upper guide member 116 and lower guide member 132. The metal stock is fed under feeding clamp member 118, clamp member 124 and die 126. The feeding member 118 frictionally engages the metal stock 112 just prior to moving from left to right in order to move the metal stock 112 into the punch press 170 such that the top die 126 can stamp the metal stock 112. Clamp 124 is released and the clamp on 118 is engaged on stock 112. Feeding clamp member 118 moves left and right as shown by arrow D. Clamp 124 now becomes engaged and the clamp on 118 is released. Feeding clamp member 118 slips over stock 112 as it moves from right to left. A two-position feed length control member 120 controls the feed length of stock 112 into the punch press 170. When the feed length control member 120 is in the up position as shown in phantom in FIG. 3 the contact bar 122 of the feeding member 118 will contact the control member 120 to limit the distance of longitudinal travel on the return stroke of the feeding member 118. The clamp member 124 moves up and down as shown by arrow E by an air piston or other drive means. The clamp member 124 places pressure on the metal stock 112 when it moves down. The downward movement and pressure is coordinated with the feeding member 118 whenever it moves longitudinally toward the roll 114 so that the metal stock 112 is not pulled from the die 126. Therefore the left to right movement of the stock 112 is not reversed. However when the feeding member 118 is moving longitudinally toward the punch press 170, the clamp member 124 is moved up into a position where it does not put pressure on the stock so that more metal stock 112 can easily be fed into the punch press 170.

As shown in FIG. 3, the feeding machine 118 is connected to the end of the piston 128 such as an air piston which is operably connected to the air cylinder 130. The control arm 120 may also be driven by an air piston. The control arm 120 has two positions; the first position being below the contact member 122 of the feeding member 118 so that the contact member 122 may travel all the way to the inward surface 132 of the guiding member 116 whereby the maximum feed distance of metal stock 112 is obtained; however when the control arm 120 is in the up position, as shown by the dashed lines on phantom representation, the contact member 122 of the feeding member 118 comes in contact with the control arm 120 and allows the feeding member 118 to traverse a lesser distance than when the control arm 120 is in the down position, thus reducing the feed length of the stock. Member 120 may have a plurality of widths at different height positions in order to vary the movement of the feeding member 118. Also the clamp member 124 has two different positions which are coordinated with the movement of the feeding clamp member 118. Whenever the feeding clamp member 118 is moving longitudinally toward the roll 114 the tension member is engaged with the metal stock 112 to prevent it from being pulled from the punch press 170, however the clamp member 124 assumes a position out of contact with the metal stock 112 just prior to the longitudinal movement of the feeding clamp member 118 toward the punch press 170 allowing the metal stock to move in that direction. It should be noted that a pulse counter (not shown) or any other device common in the art can be used to coordinate the positioning of the control arm 120 with the movement of the feeding clamp member 118 and the upward and downward movement of the top die 126 in order to produce the proper punch pattern. The punch press 170 includes a frame 172, the bottom die or motion plate 40 and the top die 126.

The punch press RAM 200 is actuated by conventional mechanical-electrical means.

Figure 10:
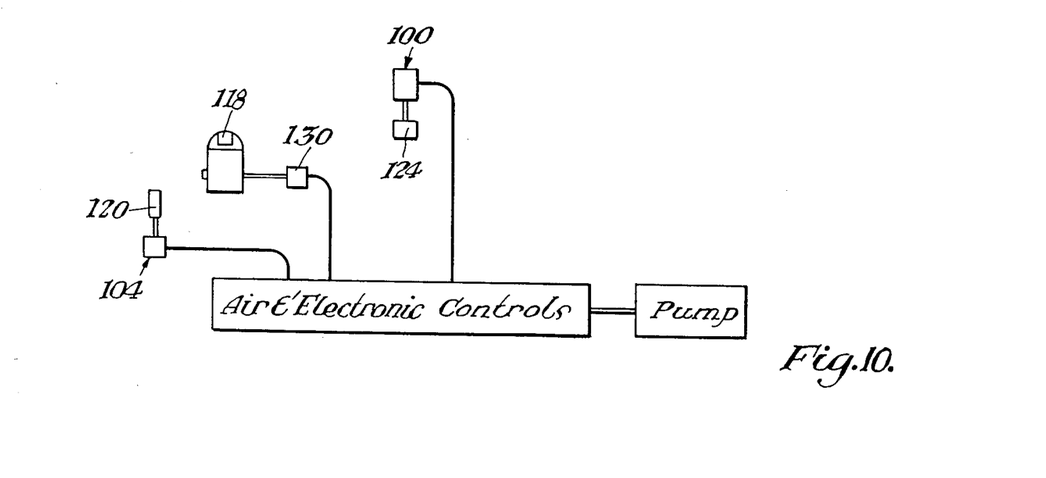
FIG. 10 is a schematic diagram of the air system.

Referring to FIG. 10, the air piston 30 drives stock feed member 118, air piston 100 drives clamp member 124, and air piston 104 drives block 120 and are connected to the air pump by an air control system that allows coordination of the movement of the pistons to provide the control and movement of the stock 112 as described above.

Figure 4A:
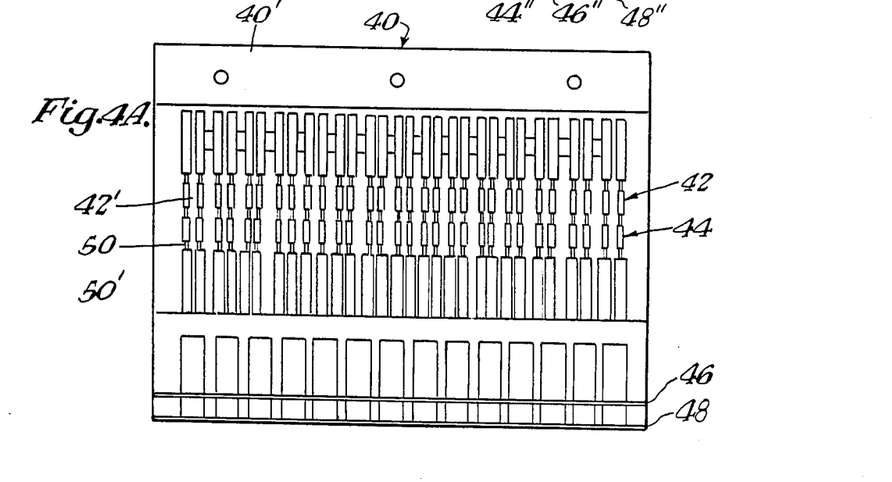
FIG. 4A is a top plan view of the bottom die.

Referring now to FIGS. 4A and 4B the top and bottom dies are shown generally at 126 and 40 with the direction of the metal stock movement being from the upper edge 40' of the drawing toward the lower edge of the drawing. This embodiment of the bottom die 40 is comprised of two rows 42 and 44 of stamping perforations which enable the top die 126 which in this embodiment would have two rows of staggered punches as shown in FIG. 4B to punch out the metal in the stock 112 to form a connector plate with a particular pattern of staggered teeth. The protruding punches 42" mate in the perforations such as at 42'. However, after the teeth are stamped in the plate and the stock is moved forward, the grooves 50 and 50' enable the teeth which already have been stamped and protrude downward from the plate to enter into an adjoining cavity in the bottom die without being crushed or held by the die. It should be noted that additional rows of stamping perforations could be added to the matrix plate 40. The only limitation being the width of the metal stock 112 as to how many staggered punches are made at one stroke of the punch press ram. Once a finished pattern as shown in FIG. 9 has been stamped into a single portion or plate, the top die 126 cutoff blade cam is actuated to move a cutting blade 46" or 48" into the stock to finish the single plate by cutting it free from the rest of the stock. The blades 46" and 48" move into openings 46 and 48. The type of pattern in the metal connector plate which has just been cut determines whether the blade 46 or blade 48 is utilized.

Figure 5:
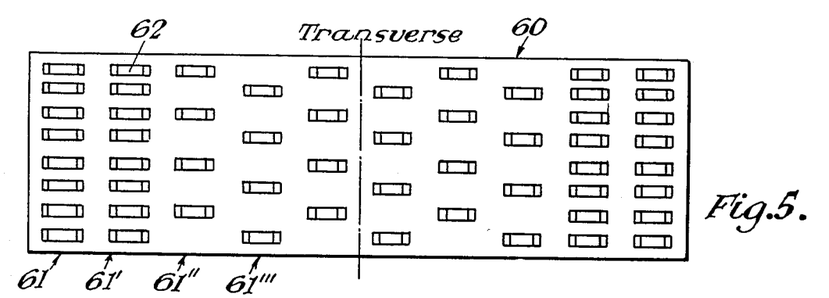
FIG. 5 is a top plan view of one embodiment of the metal connector plate.

Referring to FIG. 5, one embodiment of the metal connector plate 60 is illustrated, the direction of stock feed being from left to right. The connector plate 60 has a plurality of longitudinal slots 62 in a plurality of rows such as 61, 61', 61", 61'", etc. The slots in rows 61" and 61'" are spaced further apart near the center line of the plate than at the outermost end of the plate. This enables the plate to withstand the different forces upon it when it is used to connect the adjoining members of a truss with the joint line lying for example along the center line shown in FIG. 5.

Figure 6:
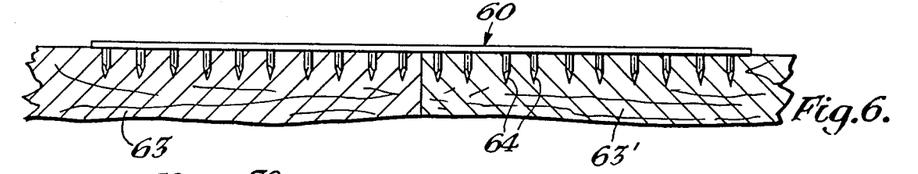
FIG. 6 is a side elevational view of the metal connector plate of FIG. 5.

Referring now to FIG. 6, a plurality of nail-like teeth 64 are shown at right angles from the connector plate 60. The nail-like teeth are formed at opposite ends of each slot 62, as each slot is punched by a manufacturing machine. The teeth are then embedded into adjoining wooden members 63 and 63' of a truss in order to maintain the adjoining wooden members in a fixed position.

Figure 7:
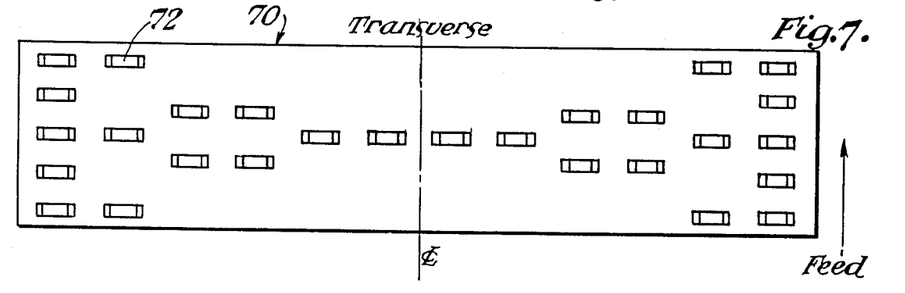
FIG. 7 is a top plan view of another embodiment of a metal connector plate.
Figure 8:
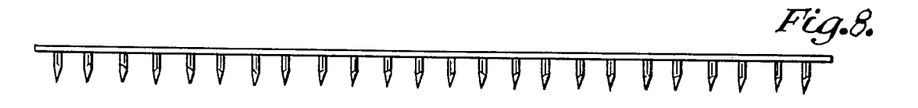
FIG. 8 is a side elevational view of the metal connector plate of FIG. 7.

Now referring to FIGS. 7 and 8, another plate 70 has a pattern of slots 72 which can be struck into the metal connector plate as illustrated, the direction of stock feed being from the bottom to the top as shown in the drawing. As can be seen by this pattern there is a complete oriented pattern of slots which allows a greater cross-sectional area of the plate to be maintained near the center line of the plate, of which the columns generally contain more TFH as they are further removed from the center line of the plate. As can be seen in the first column after the center line of the plate there is only one slot with one or more nail-like teeth projecting from the bottom surface of the plate. The second column also has only a single slot therein and, the third and fourth columns having two slots therein until the fifth column is reached which has three slots therein. The sixth column has five slots therein and so on. The position of the slots and the number of slots used in each column are calculated so that the cross-sectional area in any portion of the plate generally parallel to the center line as shown is proportional to the forces which may be exerted on the plate when the truss is installed and becomes a load bearing member.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A minimum area truss plate for withstanding a predetermined tension load and connecting a pair of abutting base members, said truss plate comprising:
   a generally flat plate having a longitudinal axis and transverse center line,
   a plurality of slot means to transfer all or part of said tension load to said base members, formed in a predetermined pattern, each slot means with at least one tooth projecting downwardly from one end of said slot means and formed by the material from said slot means, said slot means formed in a plurality of columns to constitute said pattern, at least two slots in the first column on each side of said transverse center line, and said plurality of columns being disposed on either side of and generally parallel to said center line, said columns being located sequentially along and generally perpendicular to said longitudinal axis, wherein:

each said plurality on said either side of said centerline is comprised of a first column and a plurality of other columns, said first column being located immediately adjacent to said centerline, wherein the number of slot means in each of said other columns successively distant from said centerline in the direction of said longitudinal axis is selected so that each succeeding said other column has the largest number of slot means permitted so that the lessening of said truss plate's ability to withstand tension at said each succeeding other column due to said each succeeding other column having more slot means than said first column is less than or equal to the amount of said tension load transferred to the base members by all teeth between said each succeeding column and said center line.

* * * * *